United States Patent [19]
Campbell

[11] 3,839,296
[45] Oct. 1, 1974

[54] SEQUENTIAL PREPARATION OF TRACTABLE POLYTEREPHTHALAMIDES

[75] Inventor: Robert W. Campbell, Bartlesville, Okla.

[73] Assignee: Phillips Petroleum Company, Bartlesville, Okla.

[22] Filed: May 22, 1972

[21] Appl. No.: 255,775

[52] U.S. Cl.............................................. 260/78 R
[51] Int. Cl............................................ C08g 20/20
[58] Field of Search .................................. 260/78 R

[56] References Cited
UNITED STATES PATENTS

| | | | |
|---|---|---|---|
| 2,752,328 | 6/1956 | Magat | 260/78 R |
| 3,150,113 | 9/1964 | Gabler | 260/78 R |
| 3,232,909 | 2/1966 | Werner | 260/78 R |
| 3,475,387 | 10/1969 | Carter et al. | 260/78 R |
| 3,516,972 | 6/1970 | Wolfes et al. | 260/78 R |
| 3,544,526 | 12/1970 | Kirkaldy | 260/78 R |
| 3,575,935 | 4/1971 | Elam | 260/78 R |
| 3,642,710 | 2/1972 | Keen et al. | 260/78 R |
| 3,647,761 | 3/1972 | Ridgway et al. | 260/78 R |
| 3,696,074 | 10/1972 | Tsuda et al. | 260/78 R |

*Primary Examiner*—Harold D. Anderson

[57] ABSTRACT

A salt of dicarboxylic acid and diamine, at least 50 mole percent of the dicarboxylic acid being terephthalic acid, is condensed to form a polyterephthalamide by heating the salt to a temperature in the range of about 200°C. to about 230°C. and maintaining the salt at that temperature for about ½ hour to about 6 hours before increasing the temperature of the salt to at least 250°C. In one specific embodiment the salt contains from about 2 to about 8 mole percent excess acid.

14 Claims, No Drawings

SEQUENTIAL PREPARATION OF TRACTABLE POLYTEREPHTHALAMIDES

This invention relates to the polycondensation of a salt of terephthalic acid and a diamine.

The production of polyterephthalamides which are suitable for commercialization as molding resins or as fiber-forming polymer has been fraught with difficulties. One of these difficulties has been in obtaining a tractable polymer. Frequently polyterephthalamides exhibit nonhomogeneity, low values of inherent viscosity, and low values of solubility.

In accordance with this invention, a polyamide of terephthalic acid and a diamine having improved properties is obtained by maintaining the mixture of monomers, or salt produced from said mixture of monomers, at a temperature within the range of about 200° to about 230°C., for a period in the range of about ½ hour to about 6 hours, preferably about 1 to about 4 hours, prior to completing the polymerization by heating under conventional conditions, e.g., at a temperature in the range of about 250° to about 350°C., preferably about 300° to about 340°C., for about ¼ hour to about 16 hours, preferably about 1.5 to about 4 hours. The pressure during the heating step conducted at about 200° to about 230°C. can be within the range of about 5 to about 600 psig, preferably being about 10 to about 300 psig. During the subsequent heating, the pressure normally reaches a maximum of not more than about 1,000 psig, preferably not more than about 600 psig, and is allowed to diminish by venting gaseous material, sometimes with the aid of an inert gas, the final heating being conducted at a pressure as low as about 1 mm Hg, preferably about 10 to about 50 mm Hg.

By conducting a part of the polymerization at about 200° to about 230°C. for a period of time as described above prior to increasing the reaction temperature, one obtains a polyamide which is fusible, soluble in a solvent such as dichloroacetic acid, and homogeneous, with satisfactory inherent viscosity. In contrast, a polyamide from terephthalic acid in which the heating step at 200° to about 230°C. as described above is not employed commonly exhibits undesirable properties such as infusibility, insolubility in a solvent such as dichloroacetic acid, heterogeneity, or an inherent viscosity less desirable than that exhibited by the polymer when produced by the process of this invention. In the production of a polyamide from terephthalic acid, e.g., for use in fibers or as a molding resin, it is preferred that the polyamide have an inherent viscosity above 0.6, as measured at 30°C. on a dichloroacetic acid solution having a polyamide concentration of 0.5 gram per 100 milliliters solution. On the other hand, it is desirable that the polymer flow readily at elevated temperature to provide good processability.

Accordingly it is an object of the present invention to provide a new and improved process for the production of polyterephthalamides. Another object of the invention is the production of a homogeneous polyterephthalamide. Yet another object of the invention is to obtain a relatively soluble polyterephthalamide.

Other aspects, objects and advantages of the invention will be apparent from a study of the specification and the appended claims to the invention.

The terephthalamide salt can be formed by contacting at least one dicarboxylic acid having the formula HOOC—R—COOH wherein R is selected from divalent hydrocarbon radicals containing from 4 to 18 carbon atoms, at least 50 mole percent, and more preferably at least 70 mole percent, of the dicarboxylic acid being terephthalic acid, with at least one diamine having the formula $H_2N$—R'—$NH_2$, wherein R' is selected from divalent hydrocarbon radicals with each carbon atom to which a —$NH_2$ group is attached being an aliphatic or cycloaliphatic carbon atom, R' containing from 6 to 20 carbon atoms, preferably from 8 to 15 carbon atoms. Aromatic links or substituents can be a part of the R' radical; however, divalent aliphatic radicals and divalent cycloaliphatic radicals are presently preferred for the R' radical. Examples of dicarboxylic acids which can be employed as up to 50 mole percent of the total dicarboxylic acid include adipic acid, suberic acid, azelaic acid, sebacic acid, dodecanedioic acid, eicosanedioic acid, 2-methyltetradecanedioic acid, 1,4-cyclohexanedicarboxylic acid, 2-methyl-1,3-cyclopentanedicarboxylic acid, isophthalic acid, 1,1,3-trimethyl-5-carboxy-3-(p-carboxyphenyl)indane, and the like, and mixtures thereof.

Examples of suitable diamines include 1,6-hexanediamine, 3-methyl-1,6-hexanediamine, 2-ethyl-1,9-heptanediamine, 1,8-octanediamine, 1,10-decanediamine, 1,12-dodecanediamine, 1,15-pentadecanediamine, 1,20-eicosanediamine, 1,4-cyclohexanediamine, 1,4-bis(aminomethyl)cyclohexane, 1,4-bis(2-aminoethyl)cyclohexane, 4-(aminomethyl)cyclohexylamine, bis(4-aminocyclohexyl)methane, 2,2-bis(4-aminocyclohexyl)propane, 3-cyclopentyl-1,5-pentanediamine, 1,4-bis(aminomethyl)benzene, 1,4-bis(2-aminoethyl)benzene, 5-phenyl-1,9-nonanediamine, 4,6-dimethyl-1,3-bis(2-aminoethyl)benzene, 2,4-dimethyl-1,3-bis(2-aminoethyl)benzene, and the like, and mixtures thereof.

A presently preferred polyterephthalamide can be prepared from a salt of at least one dicarboxylic acid and at least one diamine wherein at least 70 mole percent of the dicarboxylic acid is terephthalic acid and at least 70 mole percent of the diamine is 1,12-dodecanediamine. In one embodiment of the invention, at least 70 mole percent of the salt is 1,12-dodecanediammonium terephthalate. In another embodiment of the invention, at least 70 mole percent of the salt is the salt of terephthalic acid and an admixture of 4,6-dimethyl-1,3-bis(2-aminoethyl)benzene and 2,4-dimethyl-1,3-bis(2-aminoethyl)benzene.

The molar ratio of dicarboxylic acid to diamine will generally be approximately 1:1, there being employed in the range of from about 2 mole percent excess diamine over the equimolar amount to about 8 mole percent excess acid over the equimolar amount, with the presently preferred range being from about 1 to about 5 mole percent excess acid.

The dicarboxylic acid and the diamine can be contacted in the polycondensation reactor in the presence or absence of a diluent or solvent, or the salt can be preformed and then introduced into the polycondensation reaction. Where more than one diacid and/or more than one diamine are employed, the components can be admixed to form the comonomeric salt or one or more of the individual salts can be preformed and then admixed. Water can be employed in the polymerization reaction to serve as a heat transfer agent and to aid in keeping the reactants in the reaction zone.

In accordance with the present invention the reactants are heated during a first period of time to a first temperature in the range of about 200°C. to about 230°C., preferably in the range of about 200°C. to about 220°C. The temperature of the reactants is then maintained at least substantially constant at the value of this first temperature for a second period of time in the range of about ½ hour to about 6 hours, preferably in the range of about 1 hour to about 4 hours. The temperature of the reactants is then increased during a third period of time to a second temperature above the melting point of the polyterephthalamide being produced. The invention is particularly advantageous for polycondensation processes wherein this second temperature is at least 295°C. The temperature of the reactants is then maintained at least substantially constant at this second temperature for a fourth period of time in the range of about ¼ hour to about 20 hours, preferably in the range of about 1 hour to about 8 hours. In a presently preferred embodiment the temperature of the reactants is increased at an at least substantially uniform rate during the first and third periods of time.

During a fifth period of time, the pressure in the polycondensation reactor can be reduced to atmospheric pressure, after which the reactor can be flushed with nitrogen to remove vaporous substances, and then the pressure of the reactor can be reduced to subatmospheric pressure to further aid in the removal of low-boiling substances. The temperature of the contents of the reactor will be maintained above the melting point of the polymer during the fifth period of time and generally will be maintained at least substantially at the value of the second temperature. After the end of the fifth period of time, the polymer is cooled to a temperature below the melting point of the polymer, preferably still under a blanket of nitrogen.

In the examples which follow, inherent viscosity values shown for the polyamides are based on measurements at 30°C. on dichloroacetic acid solutions having a polyamide concentration of 0.5 gram per 100 milliliters solution.

EXAMPLE I

Two runs were conducted on the production of a polyamide by polymerization of 3.0 g. of the salt (pH 7.1) of terephthalic acid and 1,12-dodecanediamine, i.e., 1,12-dodecanediammonium terephthalate, run (a) representing a conventional process outside the scope of this invention, run (b) illustrating the process of this invention. The reaction conditions and results were as follows:

Run (a): Conventional process.

| Time, minutes | Temperature, °C | Comments |
|---|---|---|
| 60 | 120–210 | heated at an at least substantially uniform rate. |
| 60 | 210–280 | heated at an at least substantially uniform rate. |
| 30 | 280–320 | heated at an at least substantially uniform rate. |
| 60 | 320 | temperature maintained at least substantially constant. |
| 60 | 320 | nitrogen flush. |
| 60 | 320 | 30 mm Hg. |

The maximum pressure registered in the first 3½ hours was 16 psig. The resulting polyamide (inherent viscosity 0.63) was not homogeneous and required 4 hours for dissolution in dichloroacetic acid.

Run (b): Process of this invention.

| Time, minutes | Temperature, °C | Comments |
|---|---|---|
| 30 | 150–210 | heated at an at least substantially uniform rate. |
| 180 | 210 | temperature maintained at least substantially constant. |
| 30 | 210–320 | heated at an at least substantially uniform rate. |
| 30 | 320 | temperature maintained at least substantially constant. |
| 30 | 320 | nitrogen flush. |
| 30 | 320 | 30 mm Hg. |

The maximum pressure registered in the first 4½ hours was 18 psig. The resulting polymer (inherent viscosity 0.69) was homogeneous and required only 30 minutes for dissolution in dichloroacetic acid. Thus, the polymer was superior to that produced in the conventional process above.

EXAMPLE II

Two runs were conducted on the preparation of a polyamide by polymerization of 7.0 g. of the salt (pH 6.4) of terephthalic acid and 1,12-dodecanediamine, i.e., 1,12-dodecanediammonium terephthalate, run (a) representing a conventional process outside the scope of this invention, run (b) illustrating the process of this invention. The reaction conditions and results were as follows:

Run (a): Conventional process.

| Time, minutes | Temperature, °C | Comments |
|---|---|---|
| 60 | 120–210 | heated at an at least substantially uniform rate. |
| 60 | 210–280 | heated at an at least substantially uniform rate. |
| 30 | 280–320 | heated at an at least substantially uniform rate. |

―Continued

Run (a): Conventional process.

| Time, minutes | Temperature, °C | Comments |
| --- | --- | --- |
| 90 | 320 | temperature maintained at least substantially constant. |
| 30 | 320 | nitrogen flush. |
| 60 | 320 | 30 mm Hg. |

The pressure during the first 4 hours was maintained in the range of 10 to 15 psig. The resulting polyamide was largely insoluble in dichloroacetic acid and was not completely molten at 320°C.

Run (b): Process of this invention.

| Time, minutes | Temperature, °C | Comments |
| --- | --- | --- |
| 60 | 120–210 | heated at an at least substantially uniform rate. |
| 180 | 210 | temperature maintained at least substantially constant. |
| 60 | 210–320 | heated at an at least substantially uniform rate. |
| 60 | 320 | temperature maintained at least substantially constant. |
| 45 | 320 | nitrogen flush. |
| 45 | 320 | 30 mm Hg. |

The pressure during the first 6 hours was maintained in the range of 10 to 20 psig. The resulting polyamide was homogeneous and had an inherent viscosity of 0.79; only a trace of the polymer did not dissolve in the dichloroacetic acid. Thus, the polyamide was superior to that produced in the conventional process above.

EXAMPLE III

In each of a series of runs, 3.0 g. of the salt (pH 7.1) of terephthalic acid and 1,12-dodecanediamine used in Example I was polymerized in a manner similar to the procedure in Example I, run (b), except that the temperature was maintained at higher levels (230°C., 250°C., and 270°C., respectively) instead of at 210°C. during the 3 hour holding period. The polyamide produced under each of these sets of conditions is described below.

a. When a holding temperature of 230°C. was employed, the polyamide (inherent viscosity 0.63) present at the end of the polymerization was completely molten. Thus, the polyamide was of quite satisfactory quality, and the holding temperature of 230°C. is within the scope of those holding temperatures applicable in the process of this invention.

b. When a holding temperature of 250°C. was employed, the resulting polymer was completely molten, but the inherent viscosity was only 0.55. Thus, this polymer was inferior to that produced in run (a) above, and the use of 250°C. as the holding temperature is less desirable.

c. When a holding temperature of 270°C. was employed, the resulting polymer was inhomogeneous and therefore unsatisfactory.

EXAMPLE IV

Two runs were conducted on a larger scale and in relatively high pressure equipment to illustrate the superiority of the process of this invention over a conventional process outside the scope of this invention. The procedures and results were as follows:

Run (a): Conventional process.

To an unstirred 1-liter autoclave were charged 200.78 g. (0.548 mole) of salt (pH 7.2) prepared from terephthalic acid and 1,12-dodecanediamine, 2.72 g. (0.0164 mole) of terephthalic acid, and 45 ml of deionized water. Air was removed by purging with nitrogen. The system was then closed under 60 psig nitrogen and heated in the following manner.

| Time, minutes | Temperature, °C | Comments |
| --- | --- | --- |
| 60 | 25–210 | heated at an at least substantially uniform rate. |
| 60 | 210–280 | heated at an at least substantially uniform rate. |
| 30 | 280–320 | heated at an at least substantially uniform rate. |
| 60 | 320 | temperature maintained at least substantially constant. |
| 30 | 320 | vented slowly to atmospheric pressure. |
| 30 | 320 | nitrogen flush. |
| 15 | 320 | pressure reduced slowly to 20 mm Hg. |
| 30 | 320 | 20 mm Hg pressure. |

In the first 3½ hours the pressure reached 600 psig and was maintained in the range of 500 to 600 psig by venting as necessary. A plug was removed from the bottom of the reactor, and only a very small amount of polymer (quite rubbery) was extruded. The remainder of the polymer (inherent viscosity 1.03) was chipped out after cooling to about 25°C. under nitrogen.

Run (b): Process of this invention.

To an unstirred 1-liter autoclave were charged 200 g. (0.548 mole) of salt (pH 7.3) prepared from terephthalic acid and 1,12-dodecanediamine, 2.72 g. (0.0164 mole) of terephthalic acid, and 45 ml of deionized water. Air was removed, and the system was closed under 60 psig nitrogen, after which heating of the mixture was conducted in the following manner:

| Time, minutes | Temperature, °C | Comments |
|---|---|---|
| 30 | ~25–210 | heated at an at least substantially uniform rate. |
| 180 | 210 | temperature maintained at least substantially constant. |
| 60 | 210–320 | heated at an at least substantially uniform rate. |
| 30 | 320 | temperature maintained at least substantially constant. |
| 30 | 320 | vented slowly to atmospheric pressure. |
| 30 | 320 | nitrogen flush. |
| 15 | 320 | pressure reduced slowly to 20 mm Hg. |
| 30 | 320 | 20 mm Hg pressure. |

In the first 5 hours, the pressure reached 600 psig and was maintained in the range of 500 to 600 psig by venting as necessary. The plug was removed from the bottom of the reactor, and the molten polymer (inherent viscosity 0.82) was extruded into an aqueous quench bath. Thus, this polymer had a greater ability to flow, important for processability of a polymer, than did the polymer produced in the conventional process as described in this Example, thereby illustrating the superiority of the polymer produced by the process of this invention.

EXAMPLE V

Two runs were conducted on the production of a polyamide by polymerization of 5-7 grams of the salt (pH 6.3) of terephthalic acid and an 80/20, by weight, mixture of 4,6-dimethyl-1,3-bis(2-aminoethyl)benzene and 2,4-dimethyl-1,3-bis(2-aminoethyl)benzene, run (a) representing a conventional process outside the scope of this invention, run (b) illustrating the process of this invention. The reaction conditions and results were as follows:

Run (a): Conventional process.

| Time, minutes | Temperature, °C | Comments |
|---|---|---|
| 60 | 120–210 | heated at an at least substantially uniform rate. |
| 60 | 210–280 | heated at an at least substantially uniform rate. |
| 30 | 280–320 | heated at an at least substantially uniform rate. |
| 60 | 320 | temperature maintained at least substantially constant. |
| 60 | 320 | nitrogen flush. |
| 60 | 320 | 30 mm Hg pressure. |

The pressure was maintained in the range of 10 to 20 psig during the first 3½ hours. The resulting product (inherent viscosity 0.57) had a solid crust present at 320°C. at the end of the reaction period; thus the polymer was not homogeneous.

Run (b): Process of this invention.

| Time, minutes | Temperature, °C | Comments |
|---|---|---|
| 60 | 150–210 | heated at an at least substantially uniform rate. |
| 180 | 210 | temperature maintained at least substantially constant. |
| 30 | 210–320 | heated at an at least substantially uniform rate. |
| 30 | 320 | temperature maintained at least substantially constant. |
| 30 | 320 | nitrogen flush. |
| 30 | 320 | 30 mm Hg pressure. |

The pressure was maintained in the range of 15 to 20 psig during the first 5 hours. The resulting polyamide (inherent viscosity 0.59) was homogeneous and thus superior to the polymer produced in the conventional process not employing the 3-hour holding period at 210°C.

Reasonable variations and modifications are possible within the scope of the foregoing disclosure and the appended claims to the invention.

I claim:

1. A method of producing a tractable resinous polyterephthalamide from a salt of dicarboxylic acid and diamine, at least 50 mole percent of said dicarboxylic acid being terephthalic acid, said diamine having the formula $H_2N-R-NH_2$ wherein R is a divalent hydrocarbon radical having from 6 to 20 carbon atoms and wherein each $-NH_2$ group is attached to an aliphatic or cycloaliphatic carbon atom of said hydrocarbon radical, which comprises, in the recited sequence, the steps of heating said salt during a first period of time to a first temperature in the range of about 200°C to about 230°C, then treating the thus heated material by maintaining said thus heated material at least substantially at said first temperature for a second period of time in the range of about ½ hour to about 6 hours, then heating the thus treated material during a third period of time to a second temperature of at least 295°C, then maintaining the thus heated treated material at least substantially constant at said second temperature for a fourth period of time in the range of about ¼ hour to about 20 hours, and then recovering the thus produced polyterephthalamide.

2. A method in accordance with claim 1 wherein at least 70 mole percent of said diamine is 1,12-dodecanediamine.

3. A method in accordance with claim 1 wherein said salt is 1,12-dodecanediammonium terephthalate.

4. A method in accordance with claim 1 wherein said salt contains from about 2 mole percent of said diamine in excess of the molar amount of said acid up to about 8 mole percent acid in excess of the molar amount of said diamine.

5. A method in accordance with claim 1 wherein said dicarboxylic acid comprises up to 30 mole percent of a second acid having from 6 to 20 carbon atoms.

6. A method in accordance with claim 1 wherein said first temperature is in the range of about 200°C to about 220°C, and said second period of time is in the range of about 1 hour to about 4 hours.

7. A method in accordance with claim 6 wherein at least 70 mole percent of said diamine is 1,12-dodecanediamine.

8. A method in accordance with claim 6 wherein said salt is 1,12-dodecanediammonium terephthalate.

9. A method in accordance with claim 6 wherein said salt contains from about 1 to about 5 mole percent of said acid in excess of the molar amount of said diamine.

10. A method in accordance with claim 6 wherein said fourth period of time is in the range of about 1 hour to about 8 hours, and said diamine has from 8 to 15 carbon atoms.

11. A method in accordance with claim 10 wherein the temperature of said salt is increased at an at least substantially uniform rate during said first and third periods of time.

12. A method in accordance with claim 11 wherein at least 70 mole percent of said salt is 1,12-dodecanediammonium terephthalate.

13. A method in accordance with claim 12 wherein said salt contains from about 1 to about 5 mole percent of said acid in excess of the molar amount of said diamine.

14. A method in accordance with claim 11 wherein at least 70 mole percent of said salt is the salt of terephthalic acid and an admixture of 4,6-dimethyl-1,3-bis(2-aminoethyl)benzene and 2,4-dimethyl-1,3-bis(2-aminoethyl)benzene.

* * * * *